United States Patent

Chang

[15] 3,697,897

[45] Oct. 10, 1972

[54] FAST START-UP SYSTEM FOR AUTOMATIC TRANSVERSAL EQUALIZERS

[72] Inventor: Robert Wu-lin Chang, Middletown, N.J.

[73] Assignee: Bell Telephone Laboratories, Incorporated, Murray Hill, Berkeley Heights, N.J.

[22] Filed: May 13, 1971

[21] Appl. No.: 143,021

[52] U.S. Cl. ....................................... 333/18, 325/42

[51] Int. Cl. ............................................. H04b 3/04

[58] Field of Search .......333/18, 28 R, 70 T; 325/42, 325/62, 65

[56] References Cited

UNITED STATES PATENTS

| | | | |
|---|---|---|---|
| 3,375,473 | 3/1968 | Lucky | 333/18 |
| 3,479,458 | 11/1969 | Lord et al. | 333/18 X |

*Primary Examiner*—Paul L. Gensler

*Attorney*—R. J. Guenther and Kenneth B. Hamlin

[57] ABSTRACT

Method and apparatus for rapid initial setting in synchronous data transmission systems of transversal equalizer tap coefficients employ a resistive matrix between all delay-line taps and each attenuator to make attenuator input signals mutually orthogonal. The values of the resistive matrix elements are predetermined in accordance with the amplitude characteristics of the distorting transmission medium and the type of signal processing employed. The effect is to reduce the settling or convergence time for initial equalizer adjustment to two or three signaling intervals even in partial-response signaling systems.

3 Claims, 4 Drawing Figures

INVENTOR
BY R. W. CHANG
J. P. Kearns
ATTORNEY

FAST START-UP SYSTEM FOR AUTOMATIC TRANSVERSAL EQUALIZERS

FIELD OF THE INVENTION

This invention relates to synchronous digital data transmission systems and in particular to the rapid equalization of distorting transmission channels for partial-response signaling systems.

BACKGROUND OF THE INVENTION

Automatic equalization of voiceband telephone channels by means of transversal filters has made high-speed digital data communication possible. Attention is now being directed to the prospective use of high-speed data sets in private-line multiparty polling systems. For such applications messages tend to be short. Inasmuch, however, as transversal equalizers must be conditioned to a particular transmission path for each message, the conditioning or start-up time required by conventional methods can equal or exceed the message transmission time.

The transversal filter equalizer comprises a tapped delay line with variable tap gain apparatus. During a start-up period prior to message data transmission, these tap gains are adjusted automatically to minimize the peak distortion or the mean-square error of received test pulses or pseudorandom test sequences. The time required to converge the tap gains to near optimum settings is called settling time. Most conventional automatic equalizers have settling times measured in seconds. The full conditioning time for a data transmission system also involves operations other than equalizer adjustment such as timing recovery and synchronization and carrier phase control.

In partial-response signaling systems, in which the data transmission rate can be doubled over full-response systems utilizing the equivalent bandwidth, equalizer settling time becomes particularly long because of a high degree of correlation between successive signals.

A multiparty polling system, such as an airline reservation or an on-line banking system, is a real-time information retrieval system where the interrogation and response times are brief - message lengths are usually shorter than 1,000 bits. A 2,400-bit per second data set requires only 0.416 second to transmit a 1,000-bit message with a full-response signaling scheme. The same message can be transmitted in half or less of that time with a partial-response signaling scheme. However, a representative conventional start-up procedure consumes up to 5 seconds with full-response signaling and is even longer with partial-response signaling. Consequently, the start-up time is well over ten times that for actual message transmission. Channel utilization efficiency thus lies below ten percent with either signaling scheme.

It is an object of this invention to improve start-up time performance of data transmission systems employing automatic transversal equalizers.

It is another object of this invention to modify the automatic transversal equalizer to minimize settling time, i.e., convergence time.

It is a further object of this invention to reduce the mean-square error minimization procedure in an automatic transversal equalizer for a partial-response data transmission system as nearly as possible to a single adjustment.

SUMMARY OF THE INVENTION

The above and other objects of this invention are attained by making the tap signals as they appear at the input to the tap attenuators in a transversal equalizer mutually orthogonal, thereby minimizing the correlation therebetween. The orthogonalization is accomplished by adding an array of weighting resistors between all taps on the delay-line portion of the equalizer and the input to each tap attenuator. The values of the weighting resistors are functions of the amplitude-frequency characteristic of the transmission medium and the type of signal processing employed. The values of the weighting resistors, however, are independent of the phase-frequency characteristic of the transmission medium, the system timing and the phase of the demodulating carrier wave. When the input signals to the tap attenuators are made mutually orthogonal, the tap attenuators can be adjusted in a single step to minimize the mean-square equalization error. Thus, settling time is minimized and fast start-up is assured.

In the conventional equalizer, each delay line tap is connected directly to the input of a single weighting attenuator. Each attenuator therefore controls only the error component incident at the particular tap with which it is associated. Consequently each adjustment can reduce the overall error by a relatively small amount. According to this invention, every delay line tap is connected to every weighting attenuator through an element of a resistive matrix with the result that each instance of attenuator adjustment is effective in reducing all error components simultaneously. Therefore, it becomes possible to converge the attenuator tap settings to optimum values with a very small number of adjustments — in a time-invariant system with a single adjustment.

It is a feature of the invention that the matrix added to the conventional equalizer to insure rapid start-up time requires the use of fixed resistors only. Furthermore, the number of different resistive values needed in a given equalizer is generally less than the number of taps on the equalizer. The same values are used more than once. Many of the values are effectively open circuits.

It is another feature of this invention that the required orthogonalization matrix can be appliqued to the conventional equalizer with minimum dislocation of existing components.

DESCRIPTION OF THE DRAWING

The foregoing and other objects and features of the invention will become apparent from the following detailed description when read in conjunction with the accompanying drawing in which.

DETAILED DESCRIPTION

Figure 1:
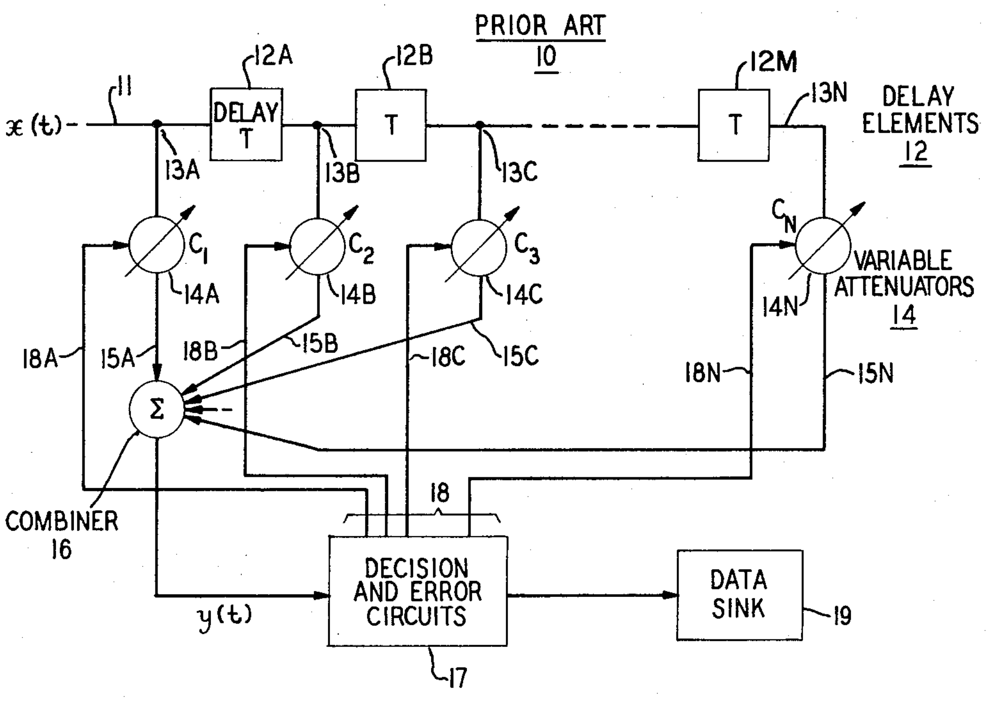
FIG. 1 is a block diagram of a representative automatic transversal equalizer of the prior art to which this invention is applicable.

FIG. 1 illustrates a representative automatic transversal equalizer of the prior art as disclosed, for example, in U.S. Pat. No. 3,375,473 issued to R. W. Lucky on Mar. 26, 1968. Equalizer 10 in FIG. 1 comprises a delay line with taps 13 equally spaced by delay units 12, an adjustable attenuator 14 connected at each tap, a combining circuit 16 for the weighted outputs of attenuators 14 and a decision and error circuit 17 for determining the departure of the equalizer output signal from a desired signal shaping and for applying discrete or proportional control signals to attenuators 14 by way of leads 18 to reduce the error.

The several individual elements of the equalizer are designated by letter suffixes. For example, tap 13B is associated with delay unit 12B and has its output signal operated on by attenuator 14B. The output of attenuator 14B in turn is applied to combining circuit 16 by way of lead 15B. Other associated elements are similarly designated. Only four taps are shown explicitly but a practical circuit usually includes a larger number.

Input signals are applied to the equalizer on lead 11. The corrected output of decision circuit 17 is utilized in data sink 19.

As an aid in understanding the invention, a brief mathematical analysis is presented. The conventional equalizer of FIG. 1 comprises the delay line with tap spacings of T second equal to the reciprocal of the baud or symbol rate of a synchronous digital system. The ith tap, $i=1$ to N, is connected through a variable gain control $c_i$ to a combiner or summing circuit 16. During message transmission information digits occur sequentially at time instants $t = \ldots, t_1-T, t_1, t_1+T, \ldots$. The output of the equalizer at combiner 16 is sampled sequentially in decision circuit 17 at times $t = \ldots, t_2, t_2+T, t_2+2T, \ldots$, to recover the information digits. Time $t_1$ differs from time $t_2$ by the inherent delay of the transmission channel. For simplicity the origin of the time axis can be shifted to make $t_2=0$.

When an impulse $\delta(t-t_1)$ is applied at the transmitter for test or initial adjustment purposes, the equalizer input on lead 11 and output at combiner 16 are respectively $x(t)$ and $y(t)$. The overall impulse response of the system is $y(t)$. The desired overall impulse response $d(t)$ is incorporated in decision circuit 17, which compares $y(t)$ and $d(t)$ to generate control signals on leads 18 for adjustment of attenuators 14 in such a way as to minimize the mean-square error difference between $y(t)$ and $d(t)$ at the sampling instants $t = \ldots, 0, T, 2T, \ldots$. In a representative 2,400-baud data system T = 1/2400 second.

The mean-square error can be written $$e=\sum_{i=-\infty}^{\infty}[y(iT)-d(iT)]^2. \quad (1)$$

From inspection of FIG. 1, it can be determined that $$y(t)=c_1x(t)+c_2x(t-T)+c_3x(t-2T)+\ldots+c_Nx[t-(N-1)T]$$

$$=\sum_{k=1}^{N}c_kx[t-(k-1)T] \quad (2)$$

where

N = the number of taps, and $K$ = tap index number.

Letting $y(iT)=y_i$ and $d(iT)=d_i$, equation (1) can be expanded to read $$e=\sum_{i=M}^{M'}[y_i^2-2y_id_i+d_i^2]$$

$$=\sum_{i=M}^{M'}y_i^2-2\sum_{i=M}^{M'}y_id_i+\sum_{i=M}^{M'}d_i^2. \quad (3)$$

The limits are reduced from infinity to M because only a finite number of distortion components are significant in practical systems.

The first element on the right of equation (3) can be analyzed by the use of equation (2) as $$\sum_{i=M}^{M'}y_i^2=\sum_{i=M}^{M'}\left[\sum_{k=1}^{N}c_kx_{i-k+1}\right]\left[\sum_{n=1}^{N}c_nx_{i-n+1}\right]. \quad (4)$$

Each of the bracketed summations of equation (4) corresponds to $y_i$ but different index numbers are used to show that every input to combiner 16 is multiplied by every other input to form the overall result. Equation (4) can be rearranged to read $$\sum_{i=M}y_i^2=\sum_{k=1}\sum_{n=1}c_kc_n\left[\sum_{i=M}^{M'}x_{i-k+1}x_{i-n+1}\right]. \quad (5)$$

The bracketed portion of equation (5) represents the correlation between adjacent tap signals on the delay line portion of equalizer 10 of FIG. 1. It constitutes a set of scalar values which can be designated $a_{kn}$. Each member of the set is independent of any of the tap attenuator coefficients $c_i$. The values $a_{kn}$ can be written as as N×N square matrix, which will be referred to hereafter as the correlation matrix, $$A=\begin{bmatrix}a_{11}a_{12} & \cdots & a_{1N}\\ a_{21}a_{22} & \cdots & a_{2N}\\ \cdot & & \cdot\\ \cdot & & \cdot\\ \cdot & & \cdot\\ a_{N1}a_{N2} & \cdots & a_{NN}\end{bmatrix}. \quad (6)$$

The sets of tap coefficients are expressible as N×1 column vectors, i.e., $c=[c_1c_2\ldots c_N]'$. (7)

In matrix notation equation (5), using equations (6) and (7), becomes $$\sum_{i=M}^{M'}y_i^2=c'Ac. \quad (8)$$

The underscoring in equations (7) and (8) indicates a row or column vector or a complete matrix array. The prime indicates a transpose of a vector or a matrix, i.e., an interchange of row and column values as $a_{ij}$ of the original becomes $b_{ji}$ of the transposed vector or matrix. The product $c'c$ is equivalent to $[c_1^2+c_2^2+\ldots+c_N^2]$.

In a similar fashion the second term on the right of equation (3) becomes $$\sum_{i=M}^{M'}y_id_i=\sum_{i=M}^{M'}\left[\sum_{k=1}^{N}c_kx_{i-k+1}\right]d_i$$

$$=\sum_{k=1}^{N} c_k \left[\sum_{i=M}^{M'} x_{i-k+1} d_i\right]$$

$$=\sum_{k=1}^{N} c_k V_k, \qquad (9)$$

where $V_k$ = the bracketed term on the second line equivalent to a correlation of the desired impulse response $d(t)$ with the tap outputs. In matrix form equation (9) becomes $$\sum_{i=M}^{M} y_i d_i = c'V, \qquad (10)$$

where V is the column vector $[V_1 V_2 \ldots V_N]'$. It may be noted that V constitutes a set of scalar values independent of the tap gain coefficients $c_i$.

Equation (3) in matrix notation now becomes $$e = c'Ac - 2c'V + \sum_{i=M}^{M'} d_i^2. \qquad (11)$$

It has been determined (see in this connection R. W. Lucky's paper "Automatic Equalization for Digital Communication," *Bell System Technical Journal*, Volumn XLIV, No. 4, April 1965) that distortion minimization in a transversal equalizer is a convex function of the tap attenuator coefficients, i.e., convergence is guaranteed. The gradient of the error with respect to each tap coefficient is $\delta e/\delta c_i$. The partial derivative of equation (11) with respect to the tap coefficients accordingly determines each tap adjustment. Thus, $$\delta e/\delta c = 2Ac - 2V$$

$$= [\delta e/\delta c_1\ \delta e/\delta c_2 \ldots \delta e/\delta c_N]'. \qquad (12)$$

The error $e$ is minimized when $\delta e/\delta c = O$ for all tap coefficients simultaneously or when $$Ac = V. \qquad (13)$$

Equation (13) states that the error is minimized when the sums of the products of the tap coefficients with the correlations of delay line tap signals are equal to the correlation of the desired impulse response with these same tap signals.

In the gradient method of tap attenuator adjustment an error component is measured and compared with each of the previous tap attenuator settings as each test pulse is received and a proportional adjustment is made in a direction which tends to reduce the error component. The algorithm can be expressed as $$c_k = c_{k-1} - \frac{\alpha_k}{2}\,\partial e/\partial c, \qquad (14)$$

where $c_k$ and $c_{k-1}$ are the present and previous tap gain values, and $\alpha_k$ is a proportionality factor representing the size of the adjustment step. The conventional equalizer in general employs only one or two discrete step sizes and therefore requires many adjustments to minimize the error initially even when there is no correlation among the several tap signals. With partial-response signals of the type employed to achieve transmission rates higher than Nyquist full-response maxima, intersymbol interference is permitted in a controlled manner. Precoding of transmitted signals to control interference causes received signals to include components from more than one transmitted signal and therefore there is a high degree of correlation among neighboring received signals. The result is that every apparent equalizer error is not a true measure of distortion and cannot be employed to control tap attenuators until the correlation between consecutive signals is first determined. Due to this correlation effect convergence time for partial-response signaling is in general considerably longer than for full-response signaling for a given adjustment algorithm, such as the gradient algorithm of equation (14).

Equation (5) defined a set of scalar values $a_{kn}$ as $$a_{kn} = \sum_{i=M}^{M'} x_{i-k+1} x_{i-n+1}. \qquad (15)$$

These values, when arranged in an ordered fashion, define the elements of the A correlation matrix given in equation (6). Each scalar value in equation (15) represents a correlation between test signals appearing at the kth and nth taps of the equalizer during start-up. When time samples of the test signals at the several taps are correlated, they are similar in magnitude and polarity. Hence, summations of their products as expressed in equation (15) are large. Uncorrelated signals are random in magnitude and polarity with respect to each other and application of equation (15) to them would result in near-zero summations.

The correlation between tap signals with partial-response signal shaping is of high order and causes interactions between succeeding tap attenuator adjustments. Slow convergence toward the minimum attainable error results.

This phenomenon can be illustrated by using an error contour plot where there are only two tap attenuators. Eigenvalue analysis is required for equalizers having more than two taps.

Figure 2:
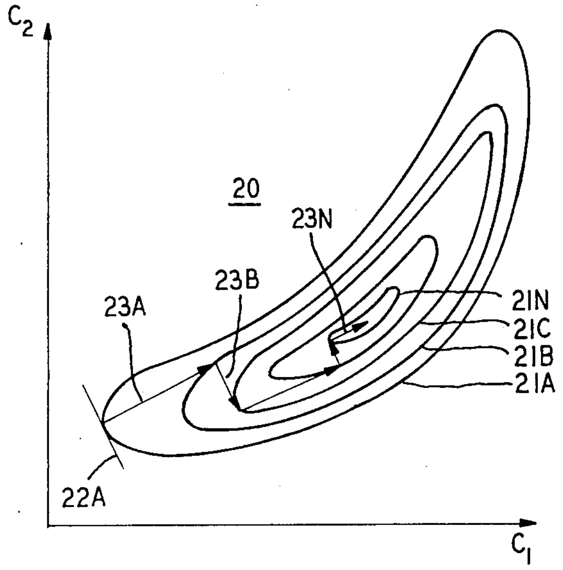
FIG. 2 and 3 are contours of equal error resulting from adjustments of tap coefficients in the conventional automatic transversal equalizer and in the improved equalizer according to this invention, respectively.

FIG. 2 is an error contour plot representing the interaction of two variable tap attenuators with coefficients $c_1$ and $c_2$ in a automatic equalizer operating on highly correlated signal samples. These equal-error contours 20 close on themselves and have the general appearance of stretched ellipses. The innermost contour 21N surrounds the point of minimum attainable error. In practicing the gradient method of attenuator control, an initial adjustment may bring the relationship of attenuator coefficients $c_1$ and $c_2$ to the outer curve 21A at tangent line 22A. The next adjustment will operate along normal 23A to a point of tangency with inner contour 21B. From contour 21B a further adjustment is made along normal 23B to another inner contour 21C. By this process the error is reduced, or at least not increased, on each adjustment until the minimum attainable error is achieved. None of the normals is directed specifically toward the minimum attainable error. The adjustments approach the minimum error along a zigzag path, requiring many adjustments. Settling time is unduly prolonged when the test signals at the several taps are uncorrelated.

Figure 3:
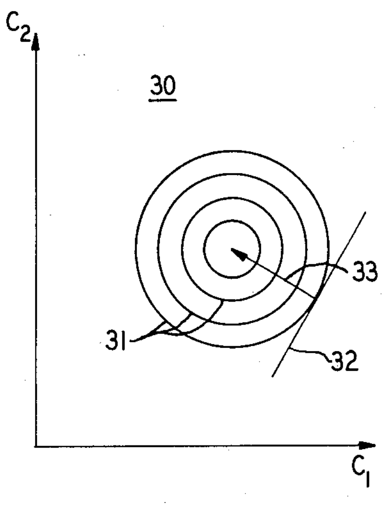

When the test signals at the several taps are uncorrelated, the error contours relating a pair of tap coefficients to each other become concentric circles as shown in plot 30 of FIG. 3. Tangents 32 to any point on circles 31 determine normals 33 directed to the minimum error condition at the center of the innermost circle. Accordingly, regardless of the initial error amount, the error can be minimized in one adjustment step with the gradient method.

For equalizers with more than two taps multidimensional space is required. Error contours can then only be visualized in the mind but not actually plotted. The number of dimensions required corresponds to the number of taps.

For practical equalizers with more than three taps it is necessary to use eigenvalue analysis to explore convergence rate.

It is known from the mathematics of matrices, such as is expounded in Chapter 6 of F. M. Stein's *Introduction to Matrices and Determinants* (Wadsworth Publishing Company, Incorporated, Belmont, California, 1967), that square N×N matrices have N characteristic values, generally called eigenvalues. The difference in value between the largest and smallest eigenvalues will be referred to as the eigenvalue spread. In this analysis the spread or difference between highest and lowest values is significant. If the N eigenvalues of the A matrix were determined, it would be found that the spread is a function of the correlation between the tap signals. The eigenvalue spread increases with the correlation. The convergence rate, in turn, depends on the eigenvalue spread.

In the Class IV partial-response system described in U.S. Pat. No. 3,388,330 issued to E. R. Kretzmer on June 11, 1968, the transmission bandwidth is limited by upper and lower cut-off frequencies with the carrier frequency placed generally at the upper band edge. The signaling interval is the reciprocal of twice the bandwidth, the difference between upper and lower band-edge frequencies. The elements of the A matrix are given above in equation (15). According to the sampling theorem, these same elements can be represented as a time integral. Thus, $$a_{kn}=2T\int_{-\infty}^{\infty} x[t-kT+T]x[t-nT+T]dt. \qquad (16)$$

Equation (16) in turn can be rewritten in frequency domain form after taking into account the inverted sinusoid-shaped frequency spectrum of the Class IV partial-response signal, i.e., $\sin \pi[(f-f_1)/(f_2-f_1)]$, where $f_1$ and $f_2$ are the lower and upper band-edge frequencies and $f$ is any frequency within the band, $$a_{ij}=(f_2-f_1)\int_0^{f_2-f_1}[\cos 2\pi f(k-n)T]\cdot\left[\left(\sin \pi\frac{f}{f_2-f_1}\right)H(f-f_o)\right]^2 df, \qquad (17)$$

where H($f$) is the frequency shaping of the transmission medium. If it is assumed that H($f$) has a constant amplitude, then the elements of the A matrix can be calculated. They are found to be, for partial-response Class IV signal processing $$a_{ij}=-(f_2-f_1)^2/4,\ \text{for } k-n=-2 \text{ or } +2$$

$$=(f_2-f_1)^2/2,\ \text{for } k-n=0$$

$$=0,\ \text{for all other } k-n. \qquad (18)$$

The constant term $(f_2-f_1)^2/2$ can be dropped and compensated, if necessary, by inserting a gain of $2/(f_{2a}-f_1)$ in the transmission channel. Then $$a_{kn}=-\tfrac{1}{2} \text{ for } k-n=-2 \text{ or } +2$$

$$=1 \text{ for } k-n=0$$

$$=0 \text{ otherwise.} \qquad (19)$$

The A matrix becomes of the following form:

$$A=\begin{bmatrix} 1 & 0 & -\frac{1}{2} & 0 & \dots & 0 \\ 0 & 1 & 0 & -\frac{1}{2} & \dots & 0 \\ -\frac{1}{2} & 0 & 1 & 0 & \dots & 0 \\ 0 & -\frac{1}{2} & 0 & 1 & \dots & 0 \\ \cdot & \cdot & \cdot & \cdot & & \cdot \\ \cdot & \cdot & \cdot & \cdot & \dots & \cdot \\ \cdot & \cdot & \cdot & \cdot & & \cdot \\ 0 & 0 & 0 & 0 & \dots & 1 \end{bmatrix} \qquad (20)$$

The presence of the nonzero off-diagonal elements causes the spread in eigenvalues of the A matrix.

It has been found that the eigenvalues calculated from equation (20) lie in the range of zero and two. A spread of eigenvalues of this range prevents the attainment of a fast convergence rate in a practical data transmission system employing partial-resonse signal processing. According to this invention, the equalizer structure of FIG. 1 can be modified to create a new correlation matrix which has no nonzero off-diagonal elements and whose eigenvalue spread is nearly zero. When the eigenvalues are substantially equal, one-step convergence becomes possible.

From matrix theory it is possible to eliminate the off-diagonal elements of value (−½) in equation (20) by finding an orthogonalization matrix P such that $PAP' = I$ (21)

Equation (21) states that there is a matrix P which will premultiply the matrix A by itself and postmultiply the matrix A by its transpose P′ (rows and columns interchanged) to produce the identity matrix I. In another manner of expression a new correlation matrix relating tap signals to each other is created and this matrix is equivalent to the identity matrix. It is found that the solution to equation (21) for a given A matrix is not unique. However, there is at least one P matrix which will satisfy the equation and such a P matrix may include many zero elements.

As an example, for an A matrix of the form of equation (20) with four rows and columns, the following P matrix has been calculated from equation (21)

$$P=\begin{bmatrix} \frac{1}{\sqrt{3}} & 0 & -\frac{1}{\sqrt{3}} & 0 \\ 1 & 0 & 1 & 0 \\ 0 & \frac{1}{\sqrt{3}} & 0 & -\frac{1}{\sqrt{3}} \\ 0 & 1 & 0 & 1 \end{bmatrix}=\begin{bmatrix} P_{11}P_{12}P_{13}P_{14} \\ P_{21}P_{22}P_{23}P_{24} \\ P_{31}P_{32}P_{33}P_{34} \\ P_{41}P_{42}P_{43}P_{44} \end{bmatrix} \qquad (22)$$

The relative positions of the elements in the bracketed matrices of equation (22) are equivalent. Thus, $P_{21} = P_{23} = P_{42} = P_{44} = 1$, $P_{11} = P_{32} = 1/\sqrt{3}$, and $P_{13} = P_{34} = -1/\sqrt{3}$. All other elements are zero. These values represent ratios of outputs to inputs of the fixed attenuators. The values are less than or equal to one in absolute terms. When the P matrix is thus chosen and implemented, the step size $\alpha_k$ of equation (14) becomes uniform for all values of $k$. Gear shifting of step size between adjustments as practiced in some prior art systems is made unnecessary.

Computer programs can be implemented to calculate the elements of a P matrix for equalizers having a greater number of taps.

Figure 4:
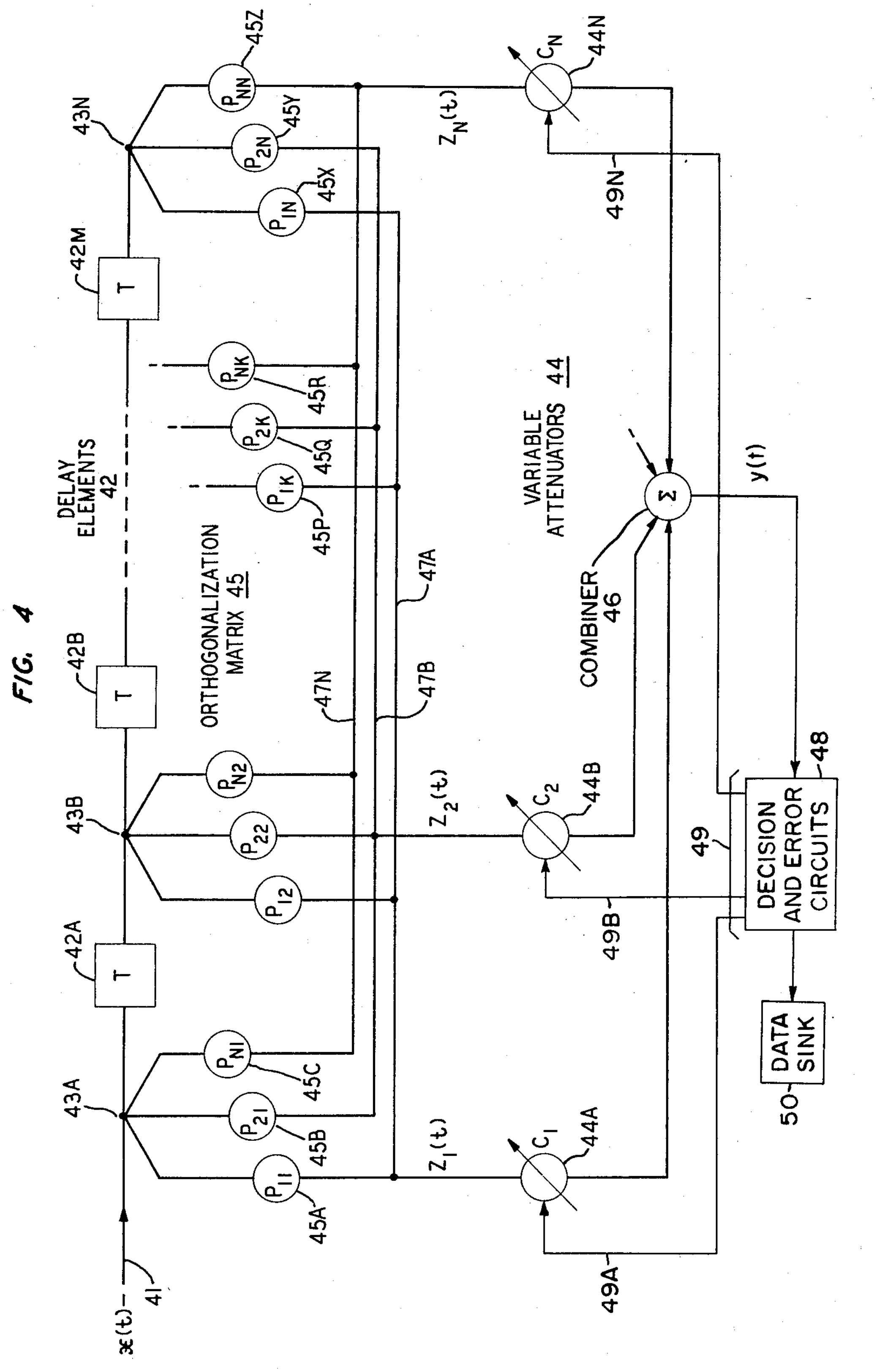
FIG. 4 is a block diagram of the automatic transversal equalizer modified according to this invention for fast start-up performance.

FIG. 4 is a block diagram of the automatic transversal equalizer modified according to this invention to include the P orthogonalization matrix. In FIG. 4 the time delayed samples of the test pulse $x(t)$ incident on input line 41 and available simultaneously at such tap locations as 43A, 43B to 43N on the delay line having equal delay elements 42A, 42B to 42N are operated on by an array of attenuators 45A, 45B and 45C at tap 43A through attenuators 45X, 45Y and 45Z at tap 43N. Attenuators 45 implement the coefficients designated in equation (22) as indicated by the corresponding designation within attenuator circles 45. The outputs of one attenuator from each of taps 43 are combined on buses 47A and 47B through 47N. For example, the outputs of attenuators $P_{11}$ and $P_{12}$ through $P_{1N}$ are combined on bus 47A to form a new input signal $z_1(t)$ to variable attenuator 44A. Similarly, the outputs of attenuators $P_{N1}$, $P_{N2}$ through $P_{NN}$ are combined on bus 47N to form an input $z_N(t)$ to variable attenuator 44N. The inputs $z(t)$ are thus made mutually orthogonal and uncorrelated.

The adjustment of the variable attenuators proceeds precisely as in the prior art. Combiner 46 combines the outputs of variable attenuators 44 to produce the signal $y(t)$. This signal is applied to decision and error circuits 48, which determine the departure of the equalizer output signal from a desired shaping and apply discrete or proportional control signals to attenuators 44 by way of leads 49. In this manner the error is reduced and a signal having the desired shape is provided to data sink 50.

It can be shown that the values of the elements of the P matrix are relatively insensitive to variations in the amplitude characteristic of the transmission medium for a given signaling scheme. Therefore, a given set of P matrix elements will perform satisfactorily for a wide range of channel amplitude characteristics. The elements of the P matrix are completely independent of the demodulation carrier phase, system timing, phase characteristic of the transmission medium and phase characteristic of transmitting and receiving filters. The mean-square error is capable of minimization in only one adjustment, regardless of the magnitude of the previous or residual error. The P matrix for other amplitude characteristics and signaling schemes can be determined according to the principles of this invention.

Even full-response signaling systems can benefit from an orthogonalization matrix where the correlation matrix possesses nonzero off-diagonal elements derived from a transmission medium whose amplitude characteristic is not optimally flat.

While this invention has been described by way of specific illustrative example, its principles are applicable to the solution of start-up problems with other signaling schemes as well.

What is claimed is:

1. In combination with a receiver for a synchronous data transmission system in which attenuators connected to taps on an associated transversal equalizer are adjusted by correlating actual received signals with a desired reference signal,
   means for establishing initial tap attenuator settings rapidly comprising
   a matrix of resistors connected between each of said taps and each of said attenuators, the values of said resistors being determined in accordance with the amplitude characteristics of a distorting transmission medium to render the input signals effective at said attenuators mutually orthogonal.

2. An automatic transversal equalizer for synchronous digital signals comprising
   a delay line having a plurality of taps consecutively spaced by the synchronous signaling interval,
   a variable attenuator associated with each of said taps,
   a combining circuit,
   means for connecting all said attenuators to said combining circuit,
   means responsive to the difference between the output of said combining circuit when a distorted impulse response signal is applied to said equalizer and a reference impulse response for forming an error signal,
   means responsive to a correlation of signal components at each of said taps with said error signal for varying said attenuators in a direction to minimize said error signal, and
   means for orthogonalizing the several signals appearing at said taps to minimize the number of adjustments required to bring said attenuators to optimum settings,
   said orthogonalizing means comprising a matrix of fixed resistors interconnecting each of said taps with each of said attenuators, the values of said resistors being selected such that a matrix A whose elements are summations of the cross-products of signals sampled at said taps when multiplied by a matrix P whose elements are the division ratio values of said fixed resistors results in the identity matrix whose principal diagonal elements are unity and all other elements are zero.

3. In an automatic transversal equalizer for a synchronous partial-response data transmission system in which there is a high degree of correlation between successive signals,
   a tapped delay line with a tap spacing equal to the reciprocal of the synchronous band rate
   a variable attenuator associated with each of said taps,
   means for adjusting said attenuators in accordance with the mean-square error difference between the summation of delay components of an impulse signal applied to said equalizer after weighting by said attenuators and a reference impulse signal, and
   means for minimizing the number of adjustments for equalizer convergence comprising an array of resistors interconnecting each of said taps with each of said variable attenuators, the values of said resistors being such that signals incident at said variable attenuators are mutually orthogonal.

* * * * *